US012739079B2

(12) United States Patent
Shukla et al.

(10) Patent No.: US 12,739,079 B2
(45) Date of Patent: Sep. 15, 2026

(54) METHOD AND APPARATUS FOR ENHANCING LINK ADAPTATION IN WIRELESS NETWORK

(71) Applicant: Samsung Electronics Co., Ltd., Suwon-si (KR)

(72) Inventors: Akhil Shukla, Bangalore (IN); Vikash Kumar, Bangalore (IN); Dheeraj Kumar, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 288 days.

(21) Appl. No.: 18/441,441

(22) Filed: Feb. 14, 2024

(65) Prior Publication Data

US 2024/0187182 A1 Jun. 6, 2024

Related U.S. Application Data

(63) Continuation of application No. PCT/KR2021/016401, filed on Nov. 11, 2021.

(30) Foreign Application Priority Data

Sep. 23, 2021 (IN) ............................ 202141043215

(51) Int. Cl.
*H04L 5/00* (2006.01)
*H04L 1/00* (2006.01)

(52) U.S. Cl.
CPC .......... *H04L 5/0051* (2013.01); *H04L 1/0003* (2013.01); *H04L 5/006* (2013.01)

(58) Field of Classification Search
CPC ...... H04L 5/0051; H04L 1/0003; H04L 5/006
See application file for complete search history.

(56) References Cited

U.S. PATENT DOCUMENTS

2014/0148177 A1 5/2014 Ratasuk et al.
2015/0139079 A1 5/2015 Zhu et al.
2020/0177259 A1 6/2020 Zu et al.
2021/0083935 A1 3/2021 Ghosh et al.
2021/0226833 A1 7/2021 Park et al.
2022/0116176 A1 4/2022 Yu et al.
2023/0006762 A1* 1/2023 Levitsky ............... H04L 1/0025

FOREIGN PATENT DOCUMENTS

CN 110138525 A 8/2019
WO 2020-223665 A1 11/2020
WO 2020-259406 A1 12/2020

OTHER PUBLICATIONS

International Search Report dated Jun. 9, 2022, issued in International Patent Application No. PCT/KR2021/016401.
Indian Office Action dated Aug. 2, 2023, issued in Indian Patent Application No. 202141043215.

* cited by examiner

*Primary Examiner* — Brenda H Pham
(74) *Attorney, Agent, or Firm* — Jefferson IP Law, LLP

(57) ABSTRACT

A method for communication by a base station in a wireless network is provided. The method includes establishing a radio resource control (RRC) connection with a user equipment (UE) in the wireless network, receiving at least one report including information indicating channel condition of at least one radio channel, from the UE, and configuring additional demodulation reference signal (DMRS) based on the information indicating the channel condition of the at least one radio channel, using a media access control (MAC) control element (MAC-CE).

18 Claims, 10 Drawing Sheets

METHOD AND APPARATUS FOR ENHANCING LINK ADAPTATION IN WIRELESS NETWORK

CROSS-REFERENCE TO RELATED APPLICATION(S)

This application is a continuation application, claiming priority under § 365(c), of an International application No. PCT/KR2021/016401, filed on Nov. 11, 2021, which is based on and claims the benefit of an Indian patent application number 202141043215, filed on Sep. 23, 2021, in the Indian Patent Office, the disclosure of which is incorporated by reference herein in its entirety.

BACKGROUND

1. Field

The disclosure relates to a wireless communication. More particularly, the disclosure relates to a method and system for enhancing a link adaptation (LA) in a wireless network.

2. Description of Related Art

In general, a demodulation reference signal (DMRS) in an uplink (UL) transmission is used for channel estimation and coherent demodulation, which comes along with a physical uplink shared channel (PUSCH) and a physical uplink control channel (PUCCH). In a downlink (DL) transmission, DMRS functions as a reference signal for decoding physical downlink shared channel (PDSCH). If the DMRS is bad or for some reason, then a base station (e.g., eNodeB (eNB), gNB) cannot decode the PUSCH and the PUCCH properly. Furthermore, the PUSCH or the PUCCH uses radio resource control (RRC) signaling messages to communicate with the base station.

As per 5$^{th}$ generation (5G) new radio (NR) 3$^{rd}$ generation partnership project (3GPP) TS 38.211 & TS 38.331 specifications, RRC configures a user equipment (UE) with an additional DMRS using an RRC reconfiguration signaling to improve decoding probability of a physical channel (e.g., PUSCH, PUCCH), especially in high mobility scenarios. However, the RRC reconfiguration signaling has a significant latency overhead, so it is not possible to configure the additional DMRS dynamically to fast-changing channel conditions.

FIG. 1 illustrates a scenario in which a UE establishes a call/communication with a network entity using existing RRC reconfiguration signaling with an additional DMRS according to the related art.

For example, consider a scenario in which a UE 10 establishes a call/communication with a gNB 20 using the existing RRC reconfiguration signaling with the additional DMRS, as illustrates in FIG. 1. At operation S101, the UE 10 receives an RRC reconfiguration message from the gNB 20. The RRC reconfiguration message includes additional DMRS position information to improve the decoding probability of the physical channel(s). At operation S102, the UE 10 sends an RRC reconfiguration complete message as an acknowledgement of receiving the RRC reconfiguration message. At operations S103-S104, the UE 10 transits into an RRC connected mode and the gNB (20) allocates radio resources to the UE 10 for data transmission over the physical channel(s). At operation S105, the UE 10 detects a change in channel conditions (e.g., degrade the quality of the physical channel(s), due to certain reasons physical channel(s) are not decoded properly at the UE 10 and/or the gNB 20, or any other reason). At operation S106, the additional DMRS remains static throughout the call as per the aforementioned 3GPP specifications.

The above information is presented as background information only to assist with an understanding of the disclosure. No determination has been made, and no assertion is made, as to whether any of the above might be applicable as prior art with regard to the disclosure.

SUMMARY

Because of a static position of the additional DMRS, decoding probability of a physical downlink shared channel (PDSCH) and the PUSCH decreases significantly, or decoding failures of the PDSCH and the PUSCH increase significantly, retransmission of the PDSCH and the PUSCH increases which carries a significant overhead in terms of a time, resources, signaling and processing at the UE 10 and the gNB 20, especially when the channel conditions of the UE 10 are changing rapidly. Furthermore, the static position of the additional DMRS impacts a UL/DL throughput of the gNB 20 for multiple end-user scenarios, such as enhanced mobile broadband (eMBB), ultra-reliable low latency communications (URLLC), voice over NR (VoNR), or the like. Furthermore, 5G NR aims for a high data rate transmission and ultra-reliable/available low-latency links. Tracking and configuring the additional DMRS for fast-changing channel conditions becomes irrelevant to the existing RRC reconfiguration procedure because of latency and signaling overheads.

Aspects of the disclosure are to address at least the above-mentioned problems and/or disadvantages and to provide at least the advantages described below. Accordingly, an aspect of the disclosure is to provide at least one useful alternative to enhance the performance of the UE and the gNB in a wireless network.

Additional aspects will be set forth in part in the description which follows and, in part, will be apparent from the description, or may be learned by practice of the presented embodiments.

In accordance with an aspect of the disclosure, a method for communication by a base station in a wireless network is provided. The method includes establishing a radio resource control (RRC) connection with a user equipment (UE) in the wireless network, receiving at least one report including information indicating channel condition of at least one radio channel, from the UE, and configuring additional demodulation reference signal (DMRS) based on the information indicating the channel condition of the at least one radio channel, using a media access control (MAC) control element (MAC-CE).

In accordance with an aspect of the disclosure, a base station for communication in a wireless network is provided. The base station includes a memory storing instructions, and at least one processor configured to, when executing the instructions, cause the base station to perform operations. The operations comprise establishing a radio resource control (RRC) connection with a user equipment (UE) in the wireless network, receiving at least one report including information indicating channel condition of at least one radio channel, from the UE, and configuring additional demodulation reference signal (DMRS) based on the information indicating the channel condition of the at least one radio channel, using a media access control (MAC) control element (MAC-CE).

In accordance with an aspect of the disclosure, non-transitory computer readable storage medium storing instructions is provided. The instructions, when executed by at least one processor of a base station, cause the base station to perform operations. The operations comprise establishing a radio resource control (RRC) connection with a user equipment (UE) in the wireless network, receiving at least one report including information indicating channel condition of at least one radio channel, from the UE, and configuring additional demodulation reference signal (DMRS) based on the information indicating the channel condition of the at least one radio channel, using a media access control (MAC) control element (MAC-CE).

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications are made within the scope of the embodiments herein without departing from the spirit thereof, and the embodiments herein include all such modifications.

An aspect of the disclosure is to enhance a LA in a wireless network by dynamically configuring an additional DMRS based on received channel conditions using a MAC control element (MAC-CE) to reduce decoding failures of a PDSCH and a PUSCH, and to improve key performance indicators (KPIs) of a system.

Another aspect of the disclosure is to assist an RRC connection by applying a machine learning (ML) model on collected data relates to a decoding success rate of the PUSCH and the PDSCH or a decoding failure rate of the PUSCH and the PDSCH with respect to the dynamically configured additional DMRS to determine an optimal additional DMRS position in terms of the decoding success rate for each UE over a monitoring period. The optimal additional DMRS position reduces decoding failures of the PDSCH and the PUSCH and improves the KPIs of the system.

Another aspect of the disclosure is to derive more accurate modulation and coding scheme (MCS) data from one of a channel state information (CSI) report, a hybrid automatic repeat request (HARQ) feedback for outer loop rate control (OLRC), mobility information (e.g., timing advance (TA), beam pattern, or the like) associated with the UE, or the dynamically configured additional DMRS. Furthermore, the optimal additional DMRS position is determined from the derived MCS data to improve throughput of a network entity (e.g., gNB, eNB, or the like), a user experience in terms of uninterrupted UL/DL data due to reduced retransmissions and the enhanced decoding success rate of the PDSCH and the PUSCH.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
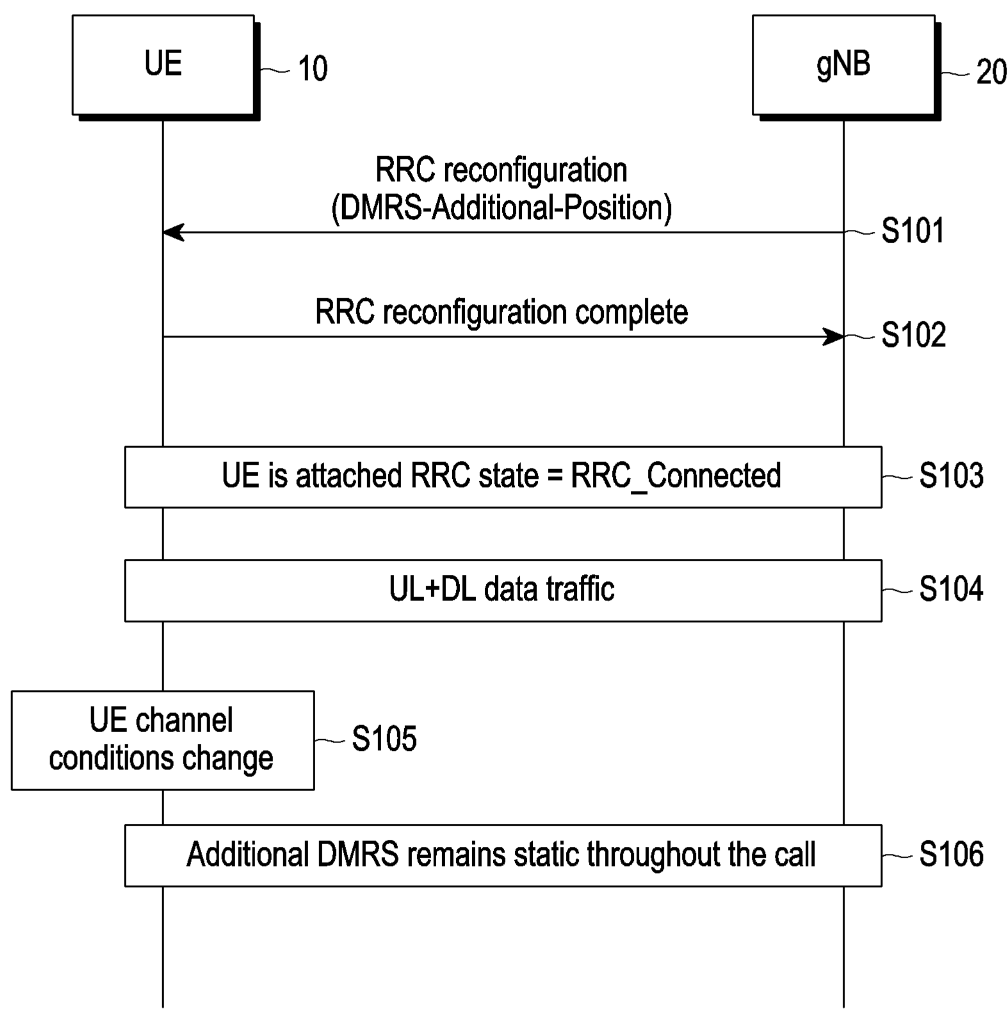
FIG. 1 illustrates a scenario in which a user equipment (UE) establishes a call/communication with a network entity using existing radio resource control (RRC) reconfiguration signaling with an additional demodulation reference signal (DMRS) according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As is traditional in the field, embodiments may be described and illustrated in terms of blocks which carry out a described function or functions. These blocks, which may be referred to herein as managers, units, modules, hardware components or the like, are physically implemented by analog and/or digital circuits, such as logic gates, integrated circuits, microprocessors, microcontrollers, memory circuits, passive electronic components, active electronic components, optical components, hardwired circuits, and the like, and may optionally be driven by firmware. The circuits may, for example, be embodied in one or more semiconductor chips, or on substrate supports, such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, or the like, may be used herein to describe various elements, these elements should not be limited by these terms. These terms are generally only used to distinguish one element from another.

Accordingly, the embodiment herein is to provide a method for enhancing a link adaptation (LA) in a wireless network. The method includes establishing, by a network entity, a radio resource control (RRC) connection with a user equipment (UE) in the wireless network. Further, the method includes receiving, by the network entity, a report(s) from the UE, where the report(s) comprises channel conditions of the radio channel. Further, the method includes dynamically configuring, by the network entity, additional demodulation reference signal (DMRS) based on the received channel conditions using a media access control (MAC) control element (MAC-CE). Further, the method includes enhancing, by the network entity, the LA of the radio channel by using the dynamically configured additional DMRS.

Accordingly, the embodiments herein provide the network entity for enhancing the LA. The network entity includes a LA controller coupled with a processor and a memory. The LA controller is configured to establish the RRC connection with the UE in the wireless network. Further, the LA controller is configured to receive the report from the UE, where the report comprises channel conditions of the radio channel. Further, the LA controller is configured to add (dynamically configured) additional DMRS based on the received channel conditions using the MAC-CE. Further, the LA controller is configured to enhance the LA of the radio channel by using the dynamically configured additional DMRS.

Accordingly, the embodiment herein is to provide a system for enhancing a LA in a wireless network. The system includes the network entity and the UE. Further, the system includes establishing the RRC connection with the UE in the wireless network. Further, the system includes receiving a report(s) from the UE, where the report(s) comprises channel conditions of the radio channel. Further, the system includes dynamically configuring additional DMRS based on the received channel conditions using a MAC-CE. Further, the system includes enhancing the LA of the radio channel by using the dynamically configured additional DMRS.

Unlike existing methods and systems, the proposed method allows the network entity to enhance the LA in the wireless network by dynamically configuring an additional DMRS based on received channel conditions using a MAC-CE to reduce decoding failures of a PDSCH and a PUSCH and improve KPIs of the system.

Unlike existing methods and systems, the proposed method allows the network entity to assist the RRC connection by applying a ML model on collected data relates to a decoding success rate of the PUSCH and the PDSCH or a decoding failure rate of the PUSCH and the PDSCH with respect to the dynamically configured additional DMRS to determine an optimal additional DMRS position in terms of the decoding success rate for each UE over a monitoring period. The optimal additional DMRS position reduces the decoding failures of the PDSCH and the PUSCH and improves the KPIs of the system.

Unlike existing methods and systems, the proposed method allows the network entity to derive more accurate MCS data from one of a CSI report, a HARQ feedback for OLRC, mobility information associated with the UE, or the dynamically configured additional DMRS. Furthermore, the optimal additional DMRS position is determined from the derived MCS data to improve throughput of a network entity, a user experience in terms of uninterrupted UL/DL data due to reduced retransmissions and the enhanced decoding success rate of the PDSCH and the PUSCH.

Referring now to the drawings and more particularly to FIGS. 2, 3A, 3B, 3C, 4, 5, 6A, 6B, 7, and 8, where similar reference characters denote corresponding features consistently throughout the figures, there are shown preferred embodiments.

Figure 2:
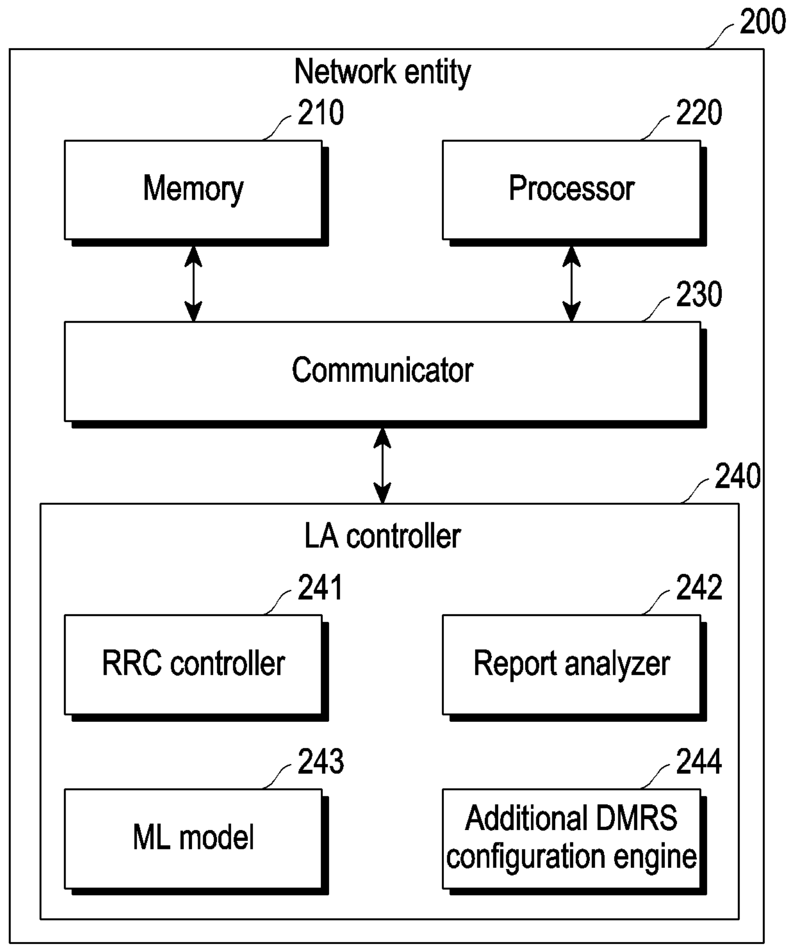
FIG. 2 illustrates a block diagram of a network entity for enhancing a link adaptation (LA) in a wireless network by dynamically configuring an additional DMRS based on received channel conditions according to an embodiment of the disclosure.

FIG. 2 illustrates a block diagram of a network entity (e.g., gNB, eNB, or the like) for enhancing a LA in a wireless network by dynamically configuring an additional DMRS based on received channel conditions according to an embodiment of the disclosure.

Referring to FIG. 2, in an embodiment of the disclosure, a network entity 200 includes a memory 210, a processor 220, a communicator 230, and an LA controller 240.

In an embodiment of the disclosure, the memory 210 is configured to store RRC connection report(s) received from a UE 100. Examples of the UE 100 include, but not limited to a smartphone, a tablet computer, a personal digital assistance (PDA), an Internet of things (IoT) device, a wearable device, or the like. Further, the memory 210 is configured to store dynamically configured additional DMRS based on the received channel conditions using a MAC-CE, data relates to a decoding success rate of a PUSCH and a PDSCH and a decoding failure rate of the PUSCH and the PDSCH with respect to the dynamically configured additional DMRS, and generated MCS data from one of a CSI report, a HARQ feedback for OLRC, mobility information associated with the UE, or the dynamically configured additional DMRS. The memory 210 stores instructions to be executed by the processor 220. The memory (210) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 210 may, in some examples, be considered a non-transitory storage medium. The term "non-transitory" may indicate that the storage medium is not embodied in a carrier wave or a propagated signal. However, the term "non-transitory" should not be interpreted that the memory 210 is non-movable. In some examples, the memory 210 can be configured to store larger amounts of information than the memory. In certain examples, a non-transitory storage medium may store data that can, over time, change (e.g., in a random access memory (RAM) or cache). The memory 210 can be an internal storage unit or it can be an external storage unit of the UE 100, a cloud storage, or any other type of external storage.

The processor 220 communicates with the memory 210, the communicator 230, and the LA controller 240. The processor 220 is configured to execute instructions stored in the memory 210 and to perform various processes. The processor 220 may include one or a plurality of processors, maybe a general-purpose processor, such as a central processing unit (CPU), an application processor (AP), or the like, a graphics-only processing unit, such as a graphics processing unit (GPU), a visual processing unit (VPU), and/or an artificial intelligence (AI) dedicated processor, such as a neural processing unit (NPU).

The communicator 230 is configured for communicating internally between internal hardware components and with external devices (e.g., UE(s), eNodeB, server, or the like) via one or more networks (e.g., radio technology). The communicator 230 includes an electronic circuit specific to a standard that enables wired or wireless communication. The communicator 230 may be referred to as a transceiver.

The LA controller 240 is implemented by processing circuitry, such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports, such as printed circuit boards, and the like. The LA controller 240 may be integrated into the processor 220 or may be implemented as a hardware separated from the processor 220.

In an embodiment of the disclosure, the LA controller 240 is configured to establish a RRC connection with the UE 100 in the wireless network. The UE 100 transits into an RRC connected mode and the network entity 200 allocates radio resources to the UE 100 for data transmission over the radio channel, where the radio channel comprises at least one of a DL channel or a UL channel. Further, the LA controller 240 is configured to receive a report(s) from the UE 100, where the report(s) comprises channel conditions of the radio channel. The report(s) comprises CQI values in the CSI report and SNIR values in a PUSCH report. Further, the LA controller 240 is configured to add additional DMRS based on the received channel conditions using a MAC-CE. Further, the LA controller 240 is configured to enhance the LA of the radio channel by using the dynamically configured additional DMRS.

Further, the LA controller 240 is configured to add the additional DMRS based on the received channel conditions to assist the RRC connection using an RRC reconfiguration message. Further, the LA controller 240 is configured to send the dynamically configured additional DMRS to the UE 100 to reduce the decoding failure of the radio channel.

Further, the LA controller 240 is configured to dynamically vary the position of the additional DMRS symbol of one of the DL channel or the UL channel based on the received channel conditions using the additional DMRS-DL MAC-CE. The detailed description relates to the dynamic configuration of the additional DMRS (additional DMRS position or additional DMRS symbol, are used interchangeably and means the same) by a MAC-CE reconfiguration are given in FIG. 4.

Further, the LA controller 240 is configured to obtain data relates to the decoding success rate of the PUSCH and the PDSCH and the decoding failure rate of the PUSCH and the PDSCH with respect to the dynamically configured additional DMRS. Further, the LA controller 240 is configured to apply an ML model 243 on the obtained data to determine an optimal additional DMRS position in terms of the decoding success rate for each UE 100 over a monitoring period. Further, the LA controller 240 is configured to determine whether a variation in the optimal additional DMRS position is more than a threshold during the monitoring period. Further, the LA controller 240 is configured to report the RRC connection with the optimal additional DMRS position in response to determining that the variation in the optimal additional DMRS position is less than the threshold during the monitoring period. Further, the LA controller 240 is configured to report the RRC connection with a default additional DMRS position in response to determining that the variation in the optimal additional DMRS position is more than the threshold during the monitoring period.

In an embodiment of the disclosure, the network entity 200 re-configures the RRC reconfiguration message with one of the reported optimal additional DMRS position and the reported default additional DMRS position, where the reported optimal additional DMRS position and the reported default additional DMRS position are valid to be configured in the RRC reconfiguration message when the RRC reconfiguration message gets triggered before an expiry timer expires.

Further, the LA controller 240 is configured to generate MCS data from one of the CSI report, the HARQ feedback for OLRC, the mobility information associated with the UE 100, and the dynamically configured additional DMRS. Further, the LA controller 240 is configured to generate MCS data from one of SNIR values in a PUSCH report, a HARQ feedback for OLRC, mobility information associated with the UE 100, and the dynamically configured additional DMRS. Further, the LA controller 240 is configured to determine the optimal additional DMRS position from the generated MCS data to enhance the LA in the wireless network.

Further, the LA controller 240 is configured to determine whether the generated MCS data values increase during the monitoring period. Further, the LA controller 240 is configured to reduce the position of the additional DMRS position from the previously configured additional DMRS position as the optimal additional DMRS position in response to determining that the generated MCS data values increase during the monitoring period. Further, the LA controller 240 is configured to increase the position of the additional DMRS position from the previously configured additional DMRS position as the optimal additional DMRS position in response to determining that the generated MCS data values decrease during the monitoring period.

In an embodiment of the disclosure, the LA controller 240 includes a RRC controller 241, a report analyzer 242, the ML model 243, and an additional DMRS configuration engine 244.

In an embodiment of the disclosure, the RRC controller 241 establishes the RRC connection with the UE 100 in the wireless network and sends the dynamically configured additional DMRS to the UE 100 to reduce the decoding failure of the radio channel.

In an embodiment of the disclosure, the report analyzer 242 receives the report from the UE 100. The ML model 243 obtains data relates to the decoding success rate of the PUSCH and the PDSCH and the decoding failure rate of the PUSCH and the PDSCH with respect to the dynamically configured additional DMRS. Furthermore, the ML model 243 applies to the received report to determine the optimal additional DMRS position in terms of the decoding success rate for each UE 100 over the monitoring period.

In an embodiment of the disclosure, the additional DMRS configuration engine 244 dynamically configures the additional DMRS based on the received channel conditions using the MAC-CE and enhances the LA of the radio channel by using the dynamically configured additional DMRS. Furthermore, the additional DMRS configuration engine 244 dynamically configures the additional DMRS based on the received channel conditions to assist the RRC connection using an RRC reconfiguration message.

Furthermore, the additional DMRS configuration engine 244 dynamically varies the position of the additional DMRS symbol of the one of the DL channel and the UL channel based on the received channel conditions using the additional DMRS position.

Furthermore, the additional DMRS configuration engine 244 dynamically varies the position of the additional DMRS symbol of the one of the DL channel and the UL channel based on the received channel conditions using the additional DMRS-DL MAC-CE.

Furthermore, the additional DMRS configuration engine 244 determines whether the variation in the optimal additional DMRS position is more than the threshold during the monitoring period. Furthermore, the additional DMRS configuration engine 244 reports the RRC connection (i.e., RRC controller 241) with the optimal additional DMRS position in response to determining that the variation in the optimal additional DMRS position is less than the threshold during the monitoring period. Furthermore, the additional DMRS configuration engine 244 reports the RRC connection with the default additional DMRS position in response to determining that the variation in the optimal additional DMRS position is more than the threshold during the monitoring period.

Furthermore, the additional DMRS configuration engine 244 generates the MCS data from one of the CSI report, the HARQ feedback for the OLRC, the mobility information associated with the UE 100, and the dynamically configured additional DMRS. Furthermore, the additional DMRS configuration engine 244 generates the MCS data from one of SNIR values in the PUSCH report, the HARQ feedback for OLRC, mobility information associated with the UE 100, and the dynamically configured additional DMRS. Furthermore, the additional DMRS configuration engine 244 reduces the position of the additional DMRS position from the previously configured additional DMRS position as the optimal additional DMRS position in response to determining that the generated MCS data values increase during the monitoring period. Furthermore, the additional DMRS configuration engine 244 increases the position of the additional DMRS position from the previously configured additional DMRS position as the optimal additional DMRS position in response to determining that the generated MCS data values decrease during the monitoring period.

Although the FIG. 2 shows various hardware components of the network entity 200 but it is to be understood that other embodiments are not limited thereon. In other embodiments of the disclosure, the network entity 200 may include less or more number of components. Further, the labels or names of the components are used only for illustrative purpose and does not limit the scope of the disclosure. One or more components can be combined together to perform same or substantially similar function to enhance the LA in the wireless network.

At least one of the plurality of modules/components of the FIG. 2 may be implemented through an artificial intelligence (AI) model. A function associated with the AI model may be performed through corresponding memory 210 and the processor 220. The one or a plurality of processors controls the processing of the input data in accordance with a predefined operating rule or AI model stored in the non-volatile memory and the volatile memory. The predefined operating rule or artificial intelligence model is provided through training or learning.

Here, being provided through learning means that, by applying a learning process to a plurality of learning data, the predefined operating rule or the AI model of the desired characteristic is made. The learning may be performed in a device itself in which AI according to an embodiment is performed, and/o may be implemented through a separate server/system.

The AI model may consist of a plurality of neural network layers. Each layer has a plurality of weight values and performs a layer operation through a calculation of a previous layer and an operation of a plurality of weights. Examples of neural networks include, but are not limited to, convolutional neural network (CNN), deep neural network (DNN), recurrent neural network (RNN), restricted Boltzmann machine (RBM), deep belief network (DBN), bidirectional recurrent deep neural network (BRDNN), generative adversarial networks (GAN), and deep Q-networks.

The learning process is a method for training a predetermined target device (for example, a robot) using a plurality of learning data to cause, allow, or control the target device to make a determination or prediction. Examples of learning processes include, but are not limited to, supervised learning, unsupervised learning, semi-supervised learning, or reinforcement learning.

Figure 3A:
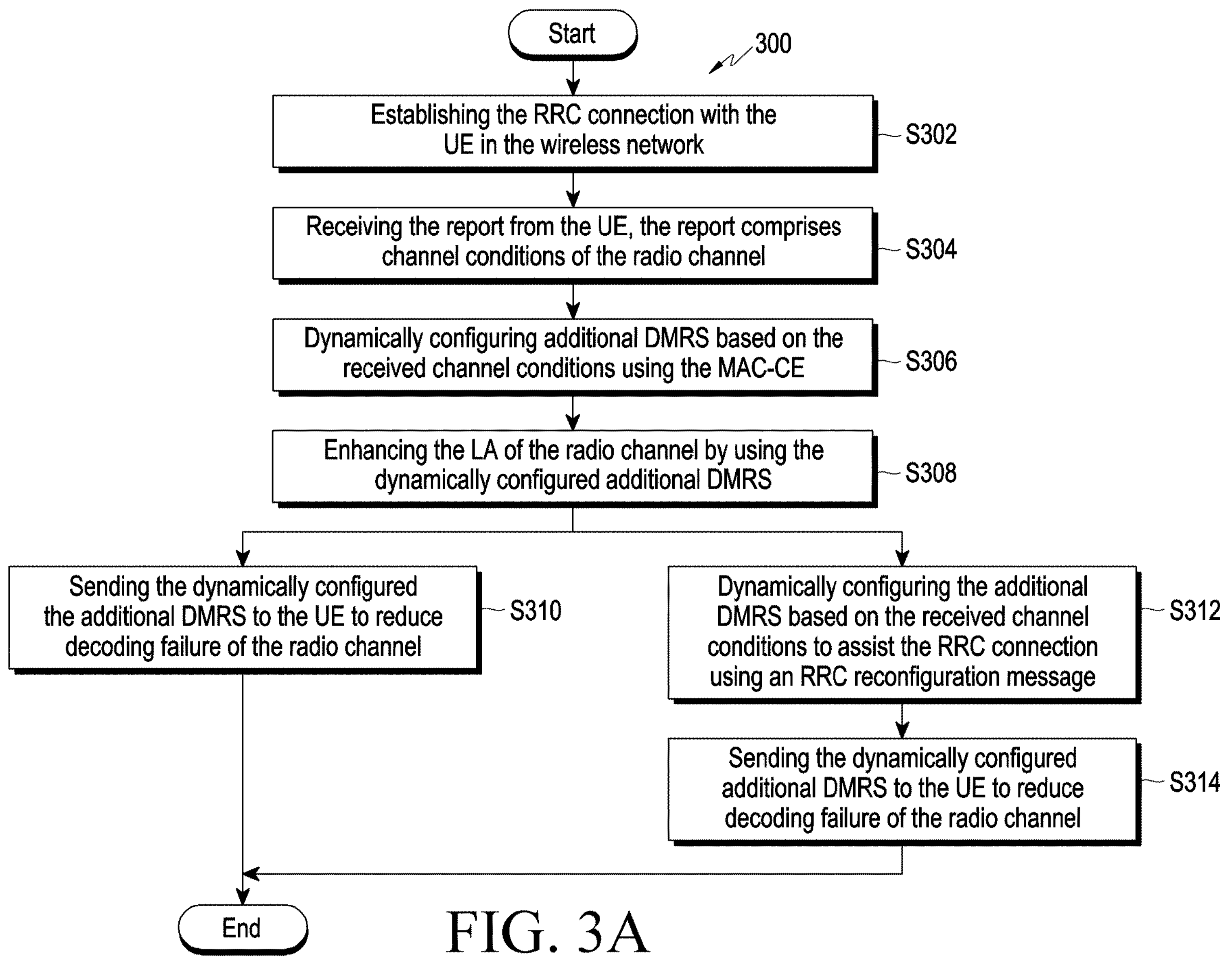
FIG. 3A is a flow diagram illustrating a method for enhancing an LA in a wireless network by dynamically configuring an additional DMRS based on received channel conditions according to an embodiment of the disclosure.

FIG. 3A is a flow diagram operation 300 illustrating a method for enhancing an LA in a wireless network by dynamically configuring an additional DMRS based on received channel conditions according to an embodiment of the disclosure.

Referring to FIG. 3A, the operations S302-S314 are performed by the network entity (200).

At operation S302, the method includes establishing the RRC connection with the UE 100 in the wireless network. At operation S304, the method includes receiving the report from the UE 100, the report comprises channel conditions of the radio channel. At operation S306, the method includes dynamically configuring additional DMRS based on the received channel conditions using the MAC-CE. At operation S308, the method includes enhancing the LA of the radio channel by using the dynamically configured additional DMRS. At operation S310, the method includes sending the dynamically configured additional DMRS to the UE 100 to reduce the decoding failure of the radio channel. At operation S312, the method includes dynamically configuring the additional DMRS based on the received channel conditions to assist the RRC connection using the RRC reconfiguration message. At operation S314, the method includes sending the dynamically configured additional DMRS to the UE 100 to reduce the decoding failure of the radio channel.

Figure 3B:
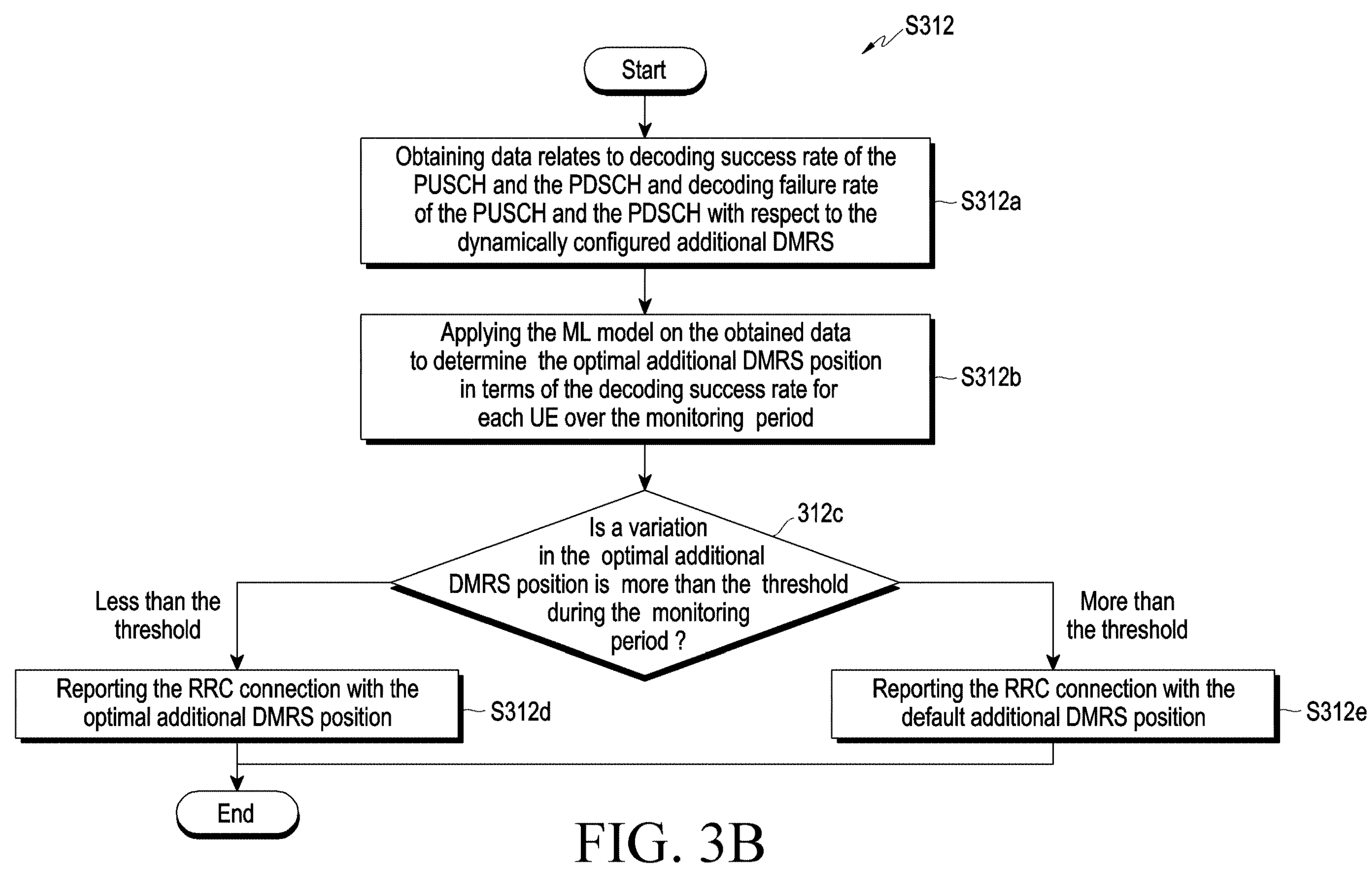
FIG. 3B is a flow diagram illustrating various operations for dynamically configuring an additional DMRS based on received channel conditions to assist a RRC connection using an RRC reconfiguration message according to an embodiment of the disclosure.

FIG. 3B is a flow diagram operation S312 illustrating various operations for dynamically configuring an additional DMRS based on received channel conditions to assist an RRC connection using a RRC reconfiguration message according to an embodiment of the disclosure.

Referring to FIG. 3B, the operations S312*a*-S312*e* are performed by the network entity 200.

At operation S312*a*, the method includes obtaining data relates to the decoding success rate of the PUSCH and the PDSCH and the decoding failure rate of the PUSCH and the PDSCH with respect to the dynamically configured additional DMRS. At operation S312*b*, the method includes applying the ML model 243 on the obtained data to determine the optimal additional DMRS position in terms of the decoding success rate for each UE 100 over the monitoring period. At operation S312*c*, the method includes determining whether the variation in the optimal additional DMRS position is more than the threshold during the monitoring period. At operation S312*d*, the method includes reporting the RRC connection with the optimal additional DMRS position in response to determining that the variation in the optimal additional DMRS position is less than the threshold during the monitoring period. At operation S312*e*, the method includes reporting the RRC connection with the default additional DMRS position in response to determining that the variation in the optimal additional DMRS position is more than the threshold during the monitoring period.

Figure 3C:
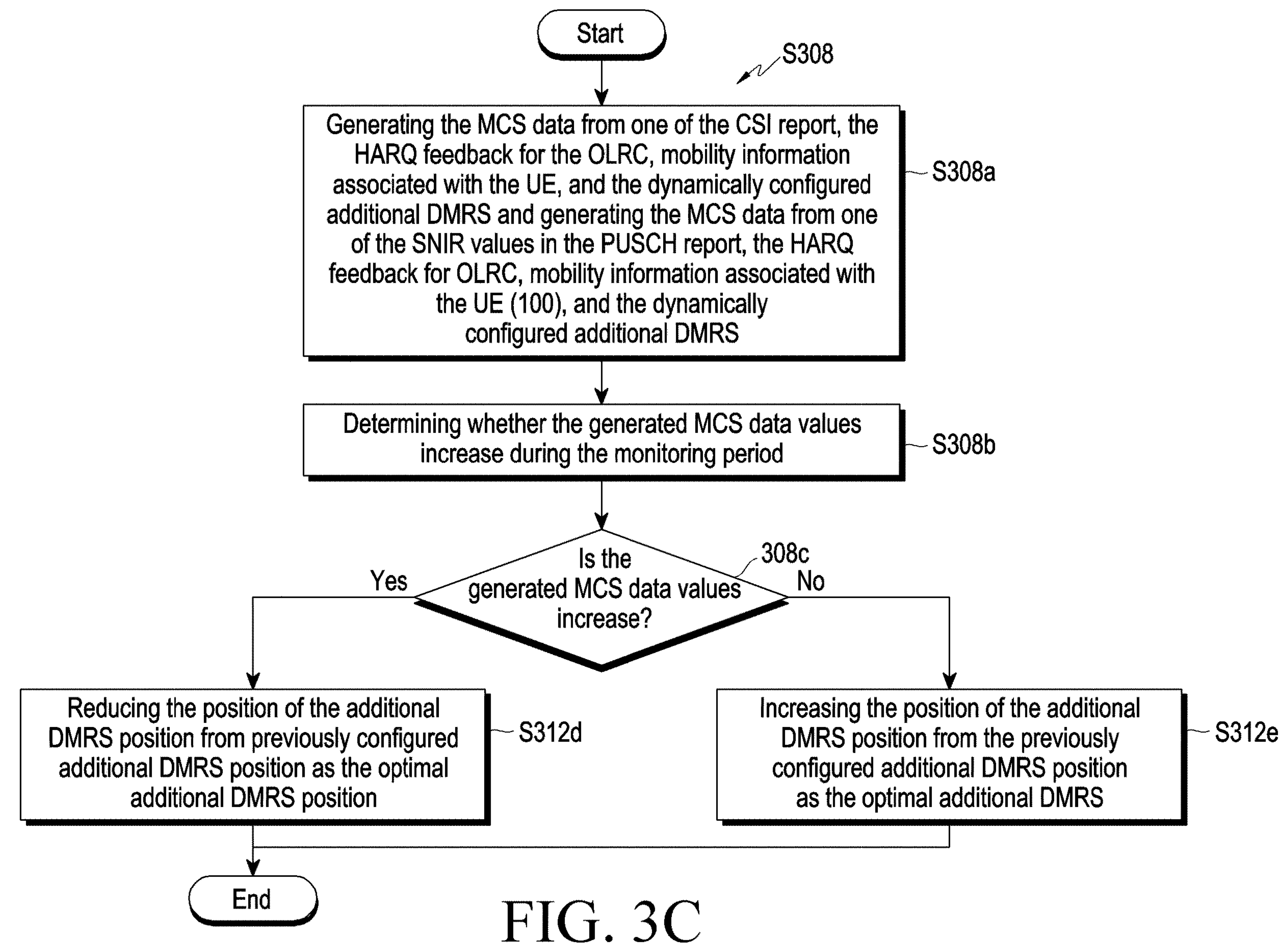
FIG. 3C is a flow diagram illustrating various operations for enhancing an LA of a radio channel by using a dynamically configured additional DMRS according to an embodiment of the disclosure.

FIG. 3C is a flow diagram operation S308 illustrating various operations for enhancing an LA of a radio channel by using a dynamically configured additional DMRS according to an embodiment of the disclosure.

Referring to FIG. 3C, the operations S308*a*-S308*e* are performed by the network entity 200.

At operation S308*a*, the method includes generating the MCS data from one of the CSI report, the HARQ feedback for the OLRC, the mobility information associated with the UE 100, and the dynamically configured additional DMRS and generating the MCS data from one of the SNIR values in the PUSCH report, the HARQ feedback for OLRC, mobility information associated with the UE 100, and the dynamically configured additional DMRS. At operations S308*b*-S308*c*, the method includes determining whether the generated MCS data values increase during the monitoring period. At operation S308*d*, the method includes reducing the position of the additional DMRS position from the previously configured additional DMRS position as the optimal additional DMRS position in response to determining that the generated MCS data values increase during the monitoring period. At operation S308*e*, the method includes increasing the position of the additional DMRS position from the previously configured additional DMRS position as the optimal additional DMRS position in response to determining that the generated MCS data values decrease during the monitoring period.

The various actions, acts, blocks, steps, or the like in the flow diagrams operations 300, S312, S308 may be performed in the order presented, in a different order or simultaneously. Further, in some embodiments of the disclosure, some of the actions, acts, blocks, steps, or the like may be omitted, added, modified, skipped, or the like without departing from the scope of the disclosure.

Figure 4:
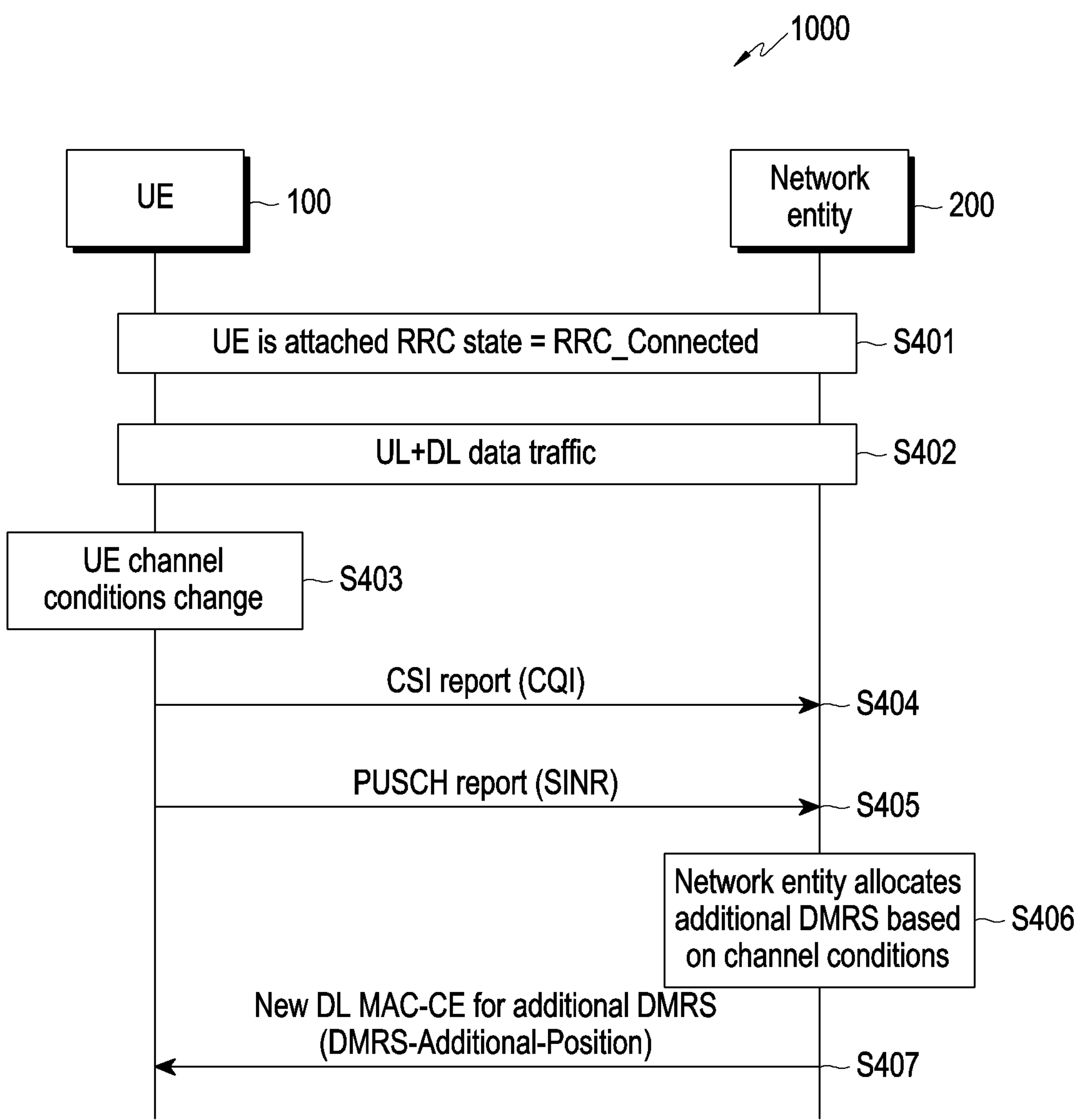
FIG. 4 is a sequence diagram illustrating various operations for configuring an additional DMRS based on received channel conditions by using a media access control (MAC) control element (MAC-CE) to reduce decoding failures of a physical downlink shared channel (PDSCH) and a physical uplink control channel (PUSCH) and improve KPIs of a system according to an embodiment of the disclosure.

FIG. 4 is a sequence diagram illustrating various operations for configuring an additional DMRS based on received channel conditions by using a MAC-CE to reduce decoding failures of a PDSCH and a PUSCH and improve KPIs of a system according to an embodiment of the disclosure.

Referring to FIG. 4, at operations S401-S402, the network entity 200 establishes the RRC connection with the UE 100 in the wireless network. The UE 100 transits into the RRC connected mode and the network entity 200 allocates the radio resources to the UE 100 for the data transmission over the radio channel. At operation S403, the UE 100 detects the changes in the channel conditions of the radio channel. At operations S404-S405, the network entity 200 receives from the UE 100, the report is generated by the UE 100 based on the detected channel conditions. The report includes the CQI values in the CSI report, the SNIR values in the PUSCH report, and any other reports relate to the channel conditions.

At operation S406, the network entity 200 dynamically configures the additional DMRS based on the received channel conditions using the MAC-CE, by performing.

The network entity 200 dynamically varies the position of the additional DMRS symbol of one of the DL channel and the UL channel based on the received channel conditions using the newly defined Additional DMRS DL MAC-CE. The Additional DMRS DL-MAC-CE are configured using the RRC reconfiguration message.

In an embodiment of the disclosure, the additional DMRS DL-MAC-CE is a new language code identifier (LCID) (i.e., 101110), a payload of the additional DMRS DL-MAC-CE is one octet, and two bits for the additional DMRS position (0, 1, 2, 3), as given in Table 1 below.

TABLE 1

| C2 | C1 | R | R | R | R | R | R |
|---|---|---|---|---|---|---|---|

At operation S407, the network entity 200 sends the dynamically configured additional DMRS to the UE 100 (configure the UE 100) to reduce the decoding failure of the radio channel or reduces the decoding failures of the PDSCH and the PUSCH to improve the KPIs of the system 1000.

Figure 5:
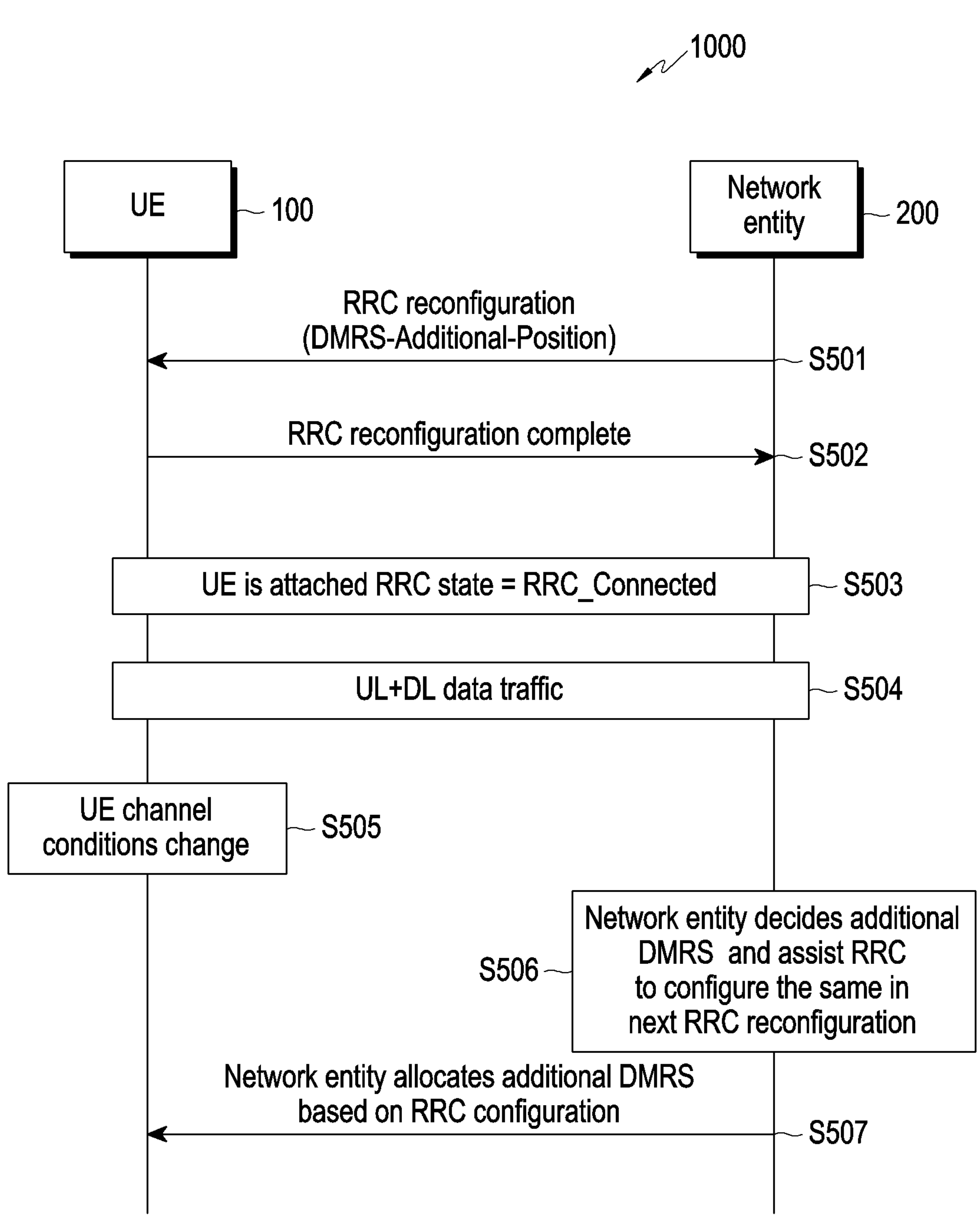
FIG. 5 is a sequence diagram illustrating various operations for assisting an RRC connection using an ML model to reduce decoding failures of a PDSCH and a PUSCH and improve KPIs of the system according to an embodiment of the disclosure.

FIG. 5 is a sequence diagram illustrating various operations for assisting an RRC connection using a ML model to reduce decoding failures of a PDSCH and a PUSCH and improve KPIs of a system according to an embodiment of the disclosure.

Referring to FIG. 5, at operations S501-S505, the same initial procedures as discussed in FIGS. 4 and 5. At operations S506-S507, the network entity 200 collects the PUSCH and the PDSCH decoding success/failure statistics with respect to the additional DMRS. Furthermore, the additional DMRS position reliability is calculated in terms of the decoding success rate of the PUSCH and the PDSCH per UE 100 based on the last N reports. Furthermore, the network entity 200 identifies the additional DMRS positions with a higher decoding failure by applying the ML model 243 (e.g., weighted moving average).

In downlink (DL), MCS is derived based on the CSI report (CQI) and outer loop rate control (OLRC) (HARQ Feedback). In uplink (UL), MCS is derived based on PUSCH, signal to interference & noise ratio (SINR), and OLRC (CRC). The MCS value indicates the channel condition and PDSCH/PUSCH decoding success/failure rate.

Derived MCS are collected over 'N' slots. Additional DMRS position reliability is calculated in terms of MCS link curve per UE 100 based 'N' slots. A weighted moving average is run to identify additional DMRS positions which are reliable and apt to achieve lower block error rate (BLER) and higher throughput.

Furthermore, the network entity 200 (MAC of the network entity 200) identifies the optimal additional DMRS position for the UE 100 over the monitoring period 'P' and reports the configuration to the RRC and configures the optimal additional DMRS position in the next RRC reconfiguration message. If a variation in the additional DMRS position more than configured threshold during the monitoring period then the default additional DMRS position would be reported to the RRC. Furthermore, the RRC of the network entity 200 runs the expiry timer (in system frame number (SFN)). After receiving the MAC reported configuration for the additional DMRS position, the expiry timer would be started. The MAC reported additional DMRS position would be valid to be configured in the RRC reconfiguration if the RRC reconfiguration message gets triggered before the expiry timer expires.

In an embodiment of the disclosure, calculation of additional DMRS position would be performed only to high mobility UEs 100 (fast-moving). Those fast-moving UE(s) 100 are determined using a timing advance (TA) and Beam. If the UE's 100 TA and beam are fast-changing (>mobility quotient 'Q') then those UE(s) 100 are selected for configuration of additional DMRS position.

In an embodiment of the disclosure, calculation of additional DMRS position would be performed only to high mobility UEs (100) (fast-moving). Those fast-moving UEs 100 are determined using timing advance (TA) and beam. If UE's 100 TA and beam are fast-changing (>mobility quotient 'Q') then those UEs 100 are selected for configuration of additional DMRS position.

In an embodiment of the disclosure, the MCS is derived based on the CSI report (CQI) and OLRC (HARQ feedback). The MCS value indicates the channel condition and PDSCH/PUSCH decoding success/failure rate.

In an embodiment of the disclosure, the additional DMRS position reliability is calculated by monitoring the MCS link curve (say MCS value trend) over the last 'N' slots.

In an embodiment of the disclosure, weighted moving average (WMA) is calculated, by Equation 1, based on MCS values of 'N' slots to calculate the reliability of additional DMRS position.

$$M = \sum\nolimits_{t=z}^{n} Wt * Vt / \sum\nolimits_{t=1}^{n} Wt \quad \text{Equation 1}$$

Where M indicates an average value, V indicates an MCS value, W indicates a weighting factor, and n indicates a number of slots (N).

In an embodiment of the disclosure, If MCS is maintained below the WMA over a monitoring period 'P' then it shows that configuration of higher Additional DMRS Position would be more apt to bring down the BLER. Reliability of additional DMRS Position could be deduced by Equation 2, $$K' = K + 1 \quad \text{Equation 2}$$

Similarly, if the MCS is maintained above WMA over a monitoring period 'P' then it shows that configuration of lower additional DMRS Position would be more apt to improve the throughput. Reliability of additional DMRS Position could be deduced by Equation 3, $$K' = K - 1 \quad \text{Equation 3}$$

Where K' indicates a new additional DMRS position and K indicates a current additional DMRS position.

In an embodiment of the disclosure, to avoid ping-pong between 2 values of Additional DMRS Position, below mechanism.

If there is variation in the additional DMRS position more than configured threshold 'TH' times during the monitoring period 'P' then the default additional DMRS position is selected.

RRC would be running an expiry timer 'T' (in SFN). After receiving MAC reported configuration for additional DMRS position, expiry timer would be started. MAC reported additional DMRS position would be valid to be configured in the RRC Reconfiguration if an RRC reconfiguration gets triggered within time duration 'T'.

a. On receiving configuration for Additional DMRS position from MAC.

i. Start or restart the expiry timer 'T'.

b. If RRC reconfiguration request gets triggered for any other purpose before timer 'T' expiry then, Configure MAC reported additional DMRS position to the UE 100.

ii. Restart the expiry timer 'T'.

c. If the expiry timer 'T' gets expired,

Trigger RRC reconfiguration request by configuring MAC reported additional DMRS position.

Figure 6A:
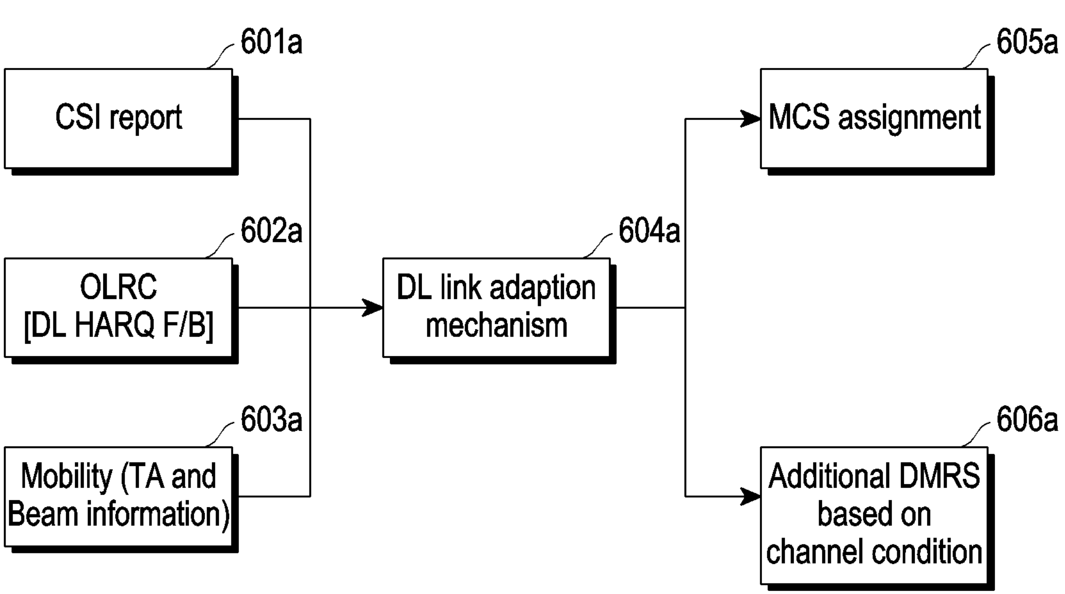
FIGS. 6A and 6B illustrate a proposed DL LA mechanism to reduce retransmissions and enhance a decoding success rate of a PDSCH and a PUSCH, according to various embodiments of the disclosure.
Figure 6B:
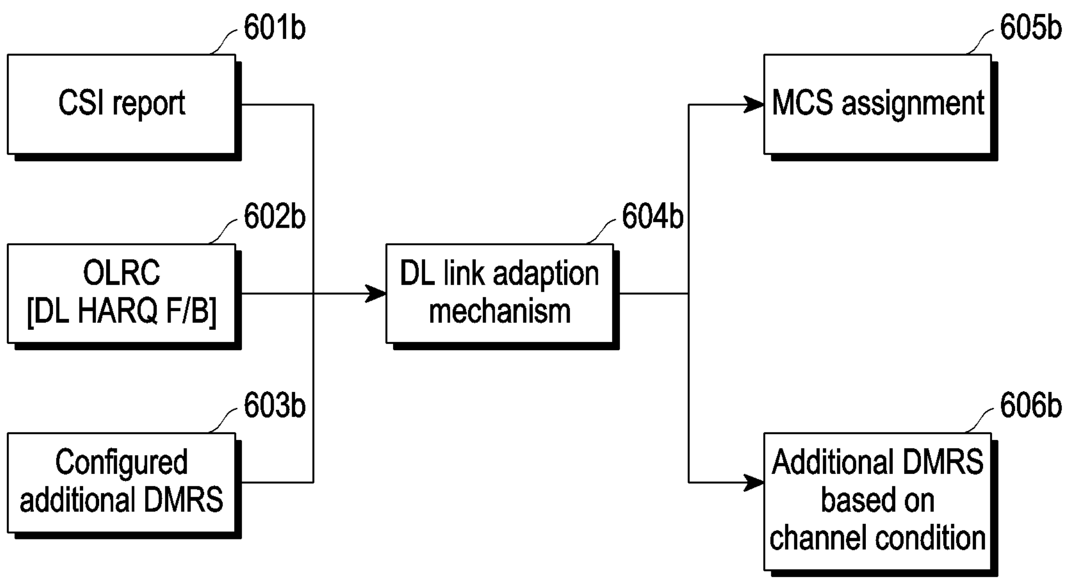

FIGS. 6A and 6B illustrate a proposed DL LA mechanism to reduce retransmissions and enhance a decoding success rate of a PDSCH and a PUSCH according to various embodiments of the disclosure.

Referring to FIG. 6A, considering a fast varying terminal position (e.g., utilizing TA and beam 603*a*, CSI report 601*a*, and OLRC 602*a*), the network entity 200 derives a MCS curve in the LA would be utilized for determination of the additional DMRS position 606*a*. Furthermore, the network entity 200 selects the MCS curve (i.e., MCS assignment/MCS data 605*a*) from UEs satisfying the fast varying TA and beam for new the additional DMRS position 606*a* determination in the monitoring period, or the network entity 200 utilizes the proposed mechanism 604*a* to select the MCS curve from UEs satisfying the fast varying TA and beam for new the additional DMRS position determination in the monitoring period. Furthermore, the network entity 200 maintains the PDSCH/PUSCH decoding failure statistics with respect to the beam, the TA, and the additional DMRS position. Thereafter, the network entity 200 calculates value "k" to utilize the PDSCH/PUSCH decoding failure statistics over the monitoring period, where "k" denotes a number of additional DMRS positions to be lowered/raised in the monitoring period.

a. When DL LA mechanism 604*a* detects that the MCS curve 605*a* moves upwards i.e., the derived MCS values ranges from low to high over a configured monitoring period, then the additional DMRS position would be lowered by 'k' positions from the last configured additional DMRS position, depending on the MCS variation range.

b. When DL LA mechanism 604*a* detects that the MCS curve 605*a* moves downwards i.e., the derived MCS values ranges from high to low over a configured monitoring period, then the additional DMRS position would be raised by 'k' positions from the last configured additional DMRS position, depending on the MCS variation range.

In an embodiment of the disclosure, the proposed mechanism 604*a* is based on a downlink LA, Same mechanism would be applied in uplink LA also.

In an embodiment of the disclosure, the TA, the beam, and the MCS curve based determination of dynamically configured additional DMRS (K'): Considering fast varying terminal position (utilizing timing advance (TA) and Beam), derived MCS curve in link adaptation (LA) is utilized for determination of additional DMRS position. Calculate the value of the new additional DMRS position (K') utilizing the same method used in solution 2 (i.e., FIG. 6B).

Referring to FIG. 6B, in addition to the CSI reports 601*b* and the OLRC 602*b*, the network entity 200 configures the additional DMRS configuration 603*b* would also be taken into account in the MCS derivation in the downlink LA. The network entity 200 determines the additional DMRS position based on the CSI reports 601*b* and the OLRC 602*b*.

a. When DL LA mechanism 604*b* detects the channel condition and the OLRC results in an upward SINR curve 605*b* i.e., SINR values ranges from low to high over the configured monitoring period, the additional DMRS position would be lowered by 'k' positions from the last configured additional DMRS position 606*b*, depending on the SINR variation range.

b. When DL LA mechanism 604*b* detects the channel condition and the OLRC results in a downward SINR curve 605*b* i.e., SINR values ranges from high to low over a configured monitoring period, additional DMRS position would be raised by 'k' positions from last configured additional DMRS position 606*b*, depending on the SINR variation range.

In an embodiment of the disclosure, if the additional DMRS position is raised then the derived MCS value would be lowered by 'm' units. 'm' would be determined based on the "additional DMRS position to m" mapping table. The mapping table is generated based on the simulated results generated from the impact of the additional DMRS position on the decoding success rate.

In an embodiment of the disclosure, the proposed mechanism 604*b* is based on the downlink LA, Same mechanism would be applied in uplink LA also.

In an embodiment of the disclosure, new link adaptation algorithm considering dynamically configured additional DMRS based on channel conditions, In DL link adaptation (LA), in addition to CSI reports (CQI) and OLRC (HARQ feedback), the current configured value of additional DMRS would also be taken into account in MCS derivation.

a. If a new additional DMRS position (K') is raised i.e., more than the current configured value (K), then the derived MCS value is lowered by 'm' units.

b. When (K'>K), additional DMRS then MCS value is (MCS−m) or when (K'<K) then MCS value is (MCS+m). Where K' indicates the new additional DMRS position, K indicates the current additional DMRS position, and m is determined based on the "Additional DMRS position to m" mapping table. This mapping table is generated based on simulated results generated from an impact of additional DMRS position to decoding success rate.

Figure 7:
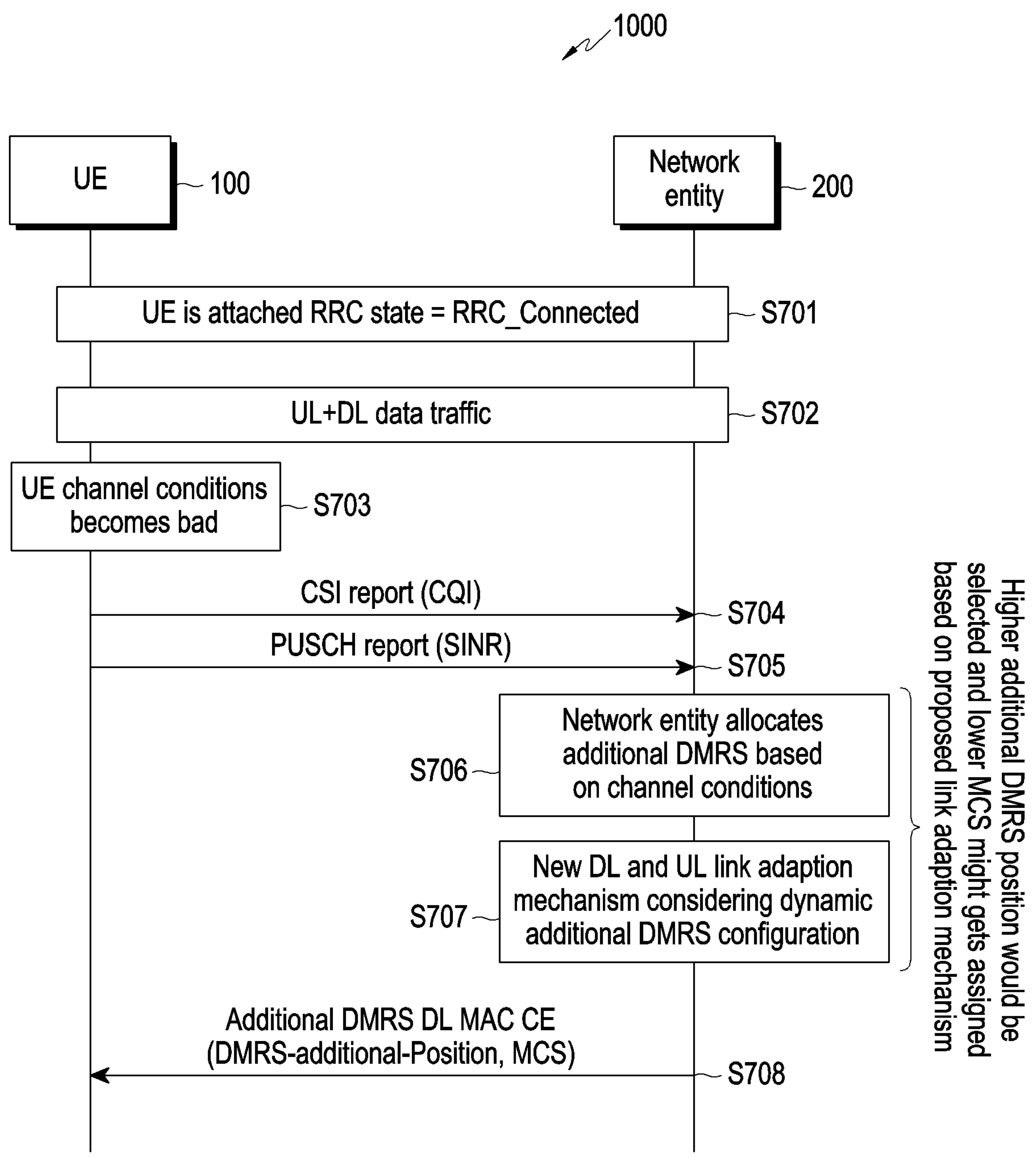
FIGS. 7 and 8 illustrate a network entity dynamically configuring DL and UL additional DMRS based on a channel condition reported by a UE according to various embodiments of the disclosure.
Figure 8:
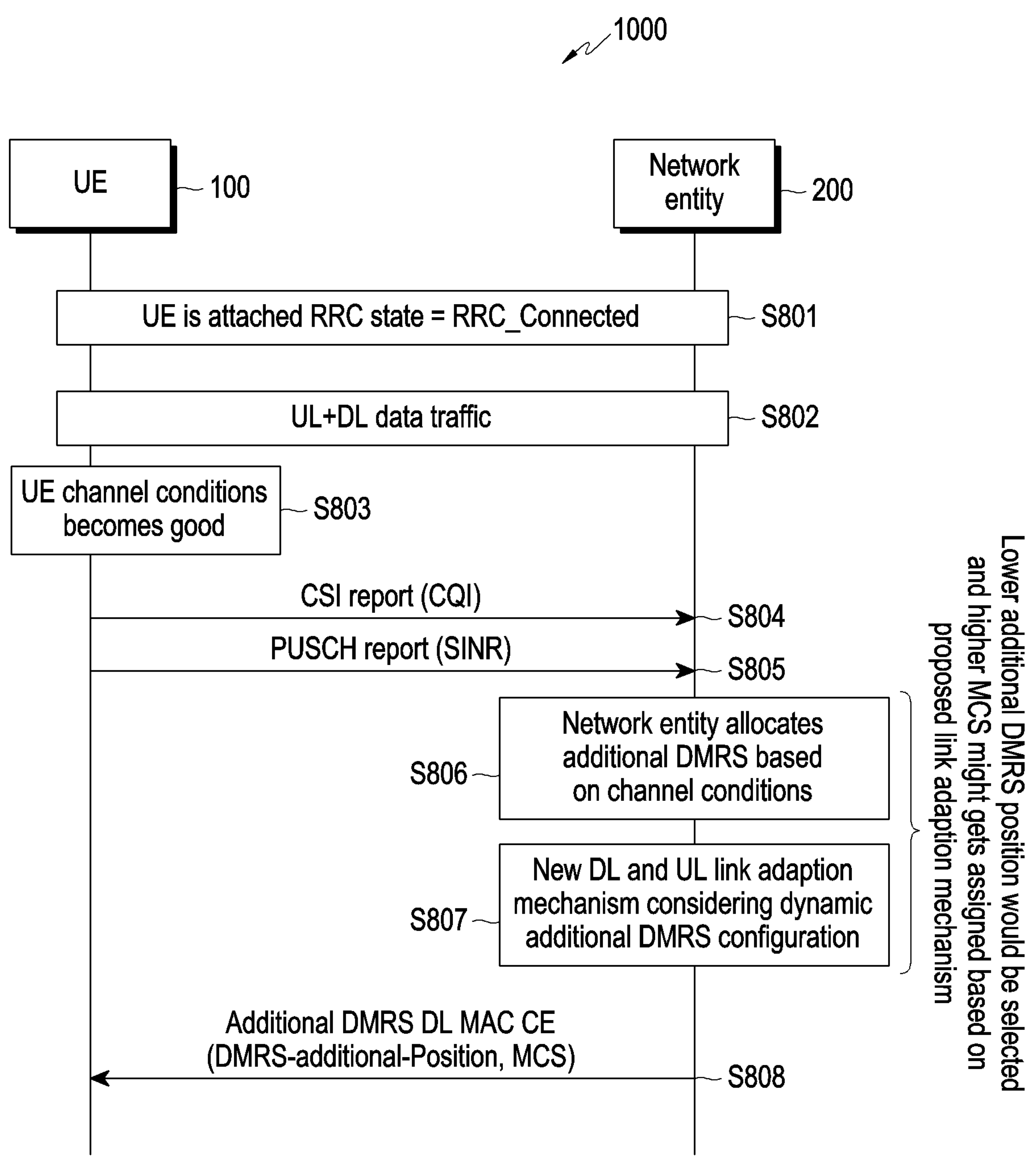

FIGS. 7 and 8 illustrate a network entity 200 dynamically configuring DL and UL additional DMRS based on a channel condition reported by a UE according to various embodiments of the disclosure.

Referring to FIG. 7, at S701-S705, the same initial procedures as discussed in FIG. 4. At operations S706-S707, the network entity 200 utilizes the proposed mechanism to select the MCS curve from the UEs satisfying the fast varying TA and beam for new the additional DMRS position determination in the monitoring period. Furthermore, the network entity 200 maintains the PDSCH/PUSCH decoding failure statistics with respect to the beam, the TA, the additional DMRS position, the CSI reports, the OLRC, and the PUSCH reports. The network entity 200 detects that the MCS curve moves downwards (channel condition is not good) i.e., the derived MCS values range from high to low over the configured monitoring period, the additional DMRS position would be raised by 'k' positions from the last configured additional DMRS position, depending on the MCS variation range. At operation S708, the network entity 200 sends the dynamically configured additional DMRS (i.e., additional DMRS DL MAC CE (DMRS-additional-position, MCS)) to the UE 100 (configure the UE 100) to reduce the decoding failure of the radio channel or reduce the decoding failures of the PDSCH and the PUSCH to improve the KPIs of the system 1000.

Referring to FIG. 8, at operations S801-S805, the same initial procedures as discussed in FIG. 4. At operations S806-S807, the network entity 200 utilizes the proposed mechanism to select the MCS curve from the UEs satisfying the fast varying TA and beam for new the additional DMRS position determination in the monitoring period. Furthermore, the network entity 200 maintains the PDSCH/PUSCH decoding failure statistics with respect to the beam, the TA, the additional DMRS position, the CSI reports, the OLRC, and the PUSCH reports. The network entity 200 detects the MCS curve moves upwards (channel condition is good) i.e., the derived MCS values ranges from low to high over the configured monitoring period, the additional DMRS position would be lowered by 'k' positions from the last configured additional DMRS position, depending on the MCS variation range. At operation S808, the network entity 200 sends the dynamically configured additional DMRS (i.e., Additional DMRS DL MAC CE (DMRS-additional-position, MCS)) to the UE 100 (configure the UE 100) to reduce the decoding failure of the radio channel or reduce the decoding failures of the PDSCH and the PUSCH to improve the KPIs of the system 1000.

In an embodiment of the disclosure, potentially critical use cases require the dynamic additional DMRS configuration, which strengthens a peak data rate, high reliability, and availability, as well as very low end-to-end latency in the range of a few milliseconds, a. Considering different communication needs of different traffic scenarios of extreme mobility, such as smart cars in association with driverless car environments, the ability to dynamically configure additional DMRS configuration based on traffic scenarios, can provide a significant contribution to the high speed/capacity and low latency demands of 5G networks.

b. In 5G, the URLLC demands cell handover latency very close to zero milliseconds. In a bad channel condition, radio link failure (RLF) or hand over (HO) failures could force the UE 100 to perform cell selection and continue with a re-establishment procedure. The dynamic additional DMRS configuration reduces a connection interruption time.

c. In 5G, the eMBB targets to provide a very high data rate for enabling augmented reality (AR)/virtual reality (VR) cloud gaming and 4K resolution video streaming by focusing on enhancements to the data rate, latency, user density, capacity, and coverage of mobile broadband access. In good channel conditions, resources used for the additional DMRS would be made available for data thus helps in achieving peak cell throughput by utilizing the dynamic additional DMRS configuration.

The embodiments disclosed herein can be implemented using at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for communication by a base station, in a wireless network, the method comprising:
- establishing a radio resource control (RRC) connection with a user equipment (UE) in the wireless network;
- receiving, from the UE, at least one report including information indicating channel condition of at least one radio channel;
- configuring, via a medium access control (MAC) control element (MAC-CE), an additional demodulation reference signal (DMRS) based on the information indicating the channel condition of the at least one radio channel; and
- sending the configured additional DMRS to the UE to reduce decoding failure of the at least one radio channel.

2. The method of claim 1, further comprising:
- configuring another additional DMRS based on the information indicating the channel condition of the at least one radio channel to assist the RRC connection using an RRC reconfiguration message; and
- sending the configured another additional DMRS to the UE to reduce decoding failure of the at least one radio channel.

3. The method of claim 2, wherein the configuring of the another additional DMRS based on the information indicating the channel condition of the at least one radio channel to assist the RRC connection using the RRC reconfiguration message, comprises:
- obtaining data relates to a decoding success rate of a physical uplink shared channel (PUSCH) and a physical downlink shared channel (PDSCH) and a decoding failure rate of the PUSCH and the PDSCH with respect to the configured additional DMRS;
- applying at least one machine learning (ML) model on the obtained data to determine an optimal position of the another additional DMRS in terms of the decoding success rate for each UE over a monitoring period;
- determining whether a variation in the optimal position of the another additional DMRS is more than a threshold during the monitoring period; and
- performing at least one of:
  - reporting the RRC connection with the optimal position of the another additional DMRS in response to determining that the variation in the optimal position of the another additional DMRS is less than the threshold during the monitoring period, or
  - reporting the RRC connection with a default position of the another additional DMRS in response to determining that the variation in the optimal position of the another additional DMRS is greater than the threshold during the monitoring period.

4. The method of claim 3,
- wherein the base station re-configures the RRC reconfiguration message with at least one of the optimal position of the another additional DMRS or the default position of the another additional DMRS, and
- wherein the optimal position of the another additional DMRS and the default position of the another additional DMRS are valid to be configured in the RRC reconfiguration message when the RRC reconfiguration message gets triggered before an expiry timer expires.

5. The method of claim 1, wherein the at least one report comprises:
- a channel state information (CSI) report including channel quality indicator (CQI) values; and
- a physical uplink shared channel (PUSCH) report including signal-to-noise-plus-interference ratio (SNIR) values.

6. The method of claim 1, wherein the configuring of the additional DMRS based on the information indicating the channel condition of the at least one radio channel using the MAC-CE comprises:
- dynamically varying a position of symbol of the additional DMRS of at least one of a downlink (DL) channel or an uplink (UL) channel based on the information indicating the channel condition of the at least one radio channel using an additional DMRS-DL MAC-CE.

7. The method of claim 6, wherein the additional DMRS-DL MAC-CE comprises an 8 bit payload, first 2 bits of which are used to configure the additional DMRS-DL MAC-CE.

8. The method of claim 1, further comprising:
- generating modulation and coding scheme (MCS) data from at least one of a channel state information (CSI) report, a hybrid automatic repeat request (HARQ) feedback for outer loop rate control (OLRC), mobility information associated with the UE, or the configured additional DMRS;
- generating the MCS data from signal-to-noise-plus-interference ratio (SNIR) values in a physical uplink shared channel (PUSCH) report, a hybrid automatic repeat request (HARQ) feedback for outer loop rate control (OLRC), mobility information associated with the UE, and the configured additional DMRS; and
- determining an optimal position of the additional DMRS from the generated MCS data to enhance a link adaptation (LA) in the wireless network.

9. The method of claim 8, wherein the determining of the optimal position of the additional DMRS from the generated MCS data to enhance the LA in the wireless network comprises:
- determining whether generated MCS data values increase during a monitoring period; and performing at least one of:

reducing a position of the additional DMRS from a previously configured position of the additional DMRS to the optimal position of the additional DMRS, in response to determining that generated MCS data values increase during the monitoring period, or increasing the position of the additional DMRS from the previously configured position of the additional DMRS to the optimal additional DMRS position, in response to determining that the generated MCS data values decrease during the monitoring period.

10. The method of claim 1, wherein the UE transits into an RRC connected mode and the base station allocates radio resources to the UE for data transmission over the at least one radio channel, and wherein the at least one radio channel comprises at least of a downlink (DL) channel and an uplink (UL) channel.

11. A base station for communication in a wireless network, the base station comprising:

a transceiver;

memory, comprising one or more storage media, storing instructions; and at least one processor communicatively coupled to the transceiver and the memory, wherein the instructions, when executed by the at least one processor individually or collectively, cause the base station to:

establish a radio resource control (RRC) connection with a user equipment (UE) in the wireless network, receive, from the UE, at least one report including information indicating channel condition of at least one radio channel, configure, via a medium access control (MAC) control element (MAC-CE), an additional demodulation reference signal (DMRS) based on the information indicating the channel condition of the at least one radio channel, and send the configured additional DMRS to the UE to reduce decoding failure of the at least one radio channel.

12. The base station of claim 11, wherein the instructions, when executed by the at least one processor individually or collectively, further cause the base station to:

configure another additional DMRS based on the information indicating the channel condition of the at least one radio channel to assist the RRC connection using an RRC reconfiguration message, and send the configured another additional DMRS to the UE to reduce decoding failure of the at least one radio channel.

13. The base station of claim 12, wherein the instructions, when executed by the at least one processor individually or collectively, further cause the base station to:

obtain data relates to a decoding success rate of a physical uplink shared channel (PUSCH) and a physical downlink shared channel (PDSCH) and a decoding failure rate of the PUSCH and the PDSCH with respect to the configured additional DMRS, apply at least one machine learning (ML) model on the obtained data to determine an optimal position of the another additional DMRS in terms of the decoding success rate for each UE over a monitoring period, determine whether a variation in the optimal position of the another additional DMRS is more than a threshold during the monitoring period, and perform at least one of:

reporting the RRC connection with the optimal position of the another additional DMRS in response to determining that the variation in the optimal position of the another additional DMRS is less than the threshold during the monitoring period, or reporting the RRC connection with a default position of the another additional DMRS in response to determining that the variation in the optimal position of the another additional DMRS is greater than the threshold during the monitoring period.

14. The base station of claim 13, wherein the instructions, when executed by the at least one processor individually or collectively, further cause the base station to:

re-configure the RRC reconfiguration message with at least one of the optimal position of the another additional DMRS or the default position of the another additional DMRS, and wherein the optimal position of the another additional DMRS and the default position of the another additional DMRS are valid to be configured in the RRC reconfiguration message when the RRC reconfiguration message gets triggered before an expiry timer expires.

15. The base station of claim 11, wherein the at least one report comprises:

a channel state information (CSI) report including channel quality indicator (CQI) values; and a physical uplink shared channel (PUSCH) report including signal-to-noise- plus-interference ratio (SNIR) values.

16. The base station of claim 11, wherein the instructions, when executed by the at least one processor individually or collectively, further cause the base station to:

dynamically vary a position of symbol of the additional DMRS of at least one of a downlink (DL) channel or an uplink (UL) channel based on the information indicating the channel condition of the at least one radio channel using an additional DMRS-DL MAC-CE.

17. The base station of claim 11, wherein the instructions, when executed by the at least one processor individually or collectively, further cause the base station to:

generate modulation and coding scheme (MCS) data from at least one of a channel state information (CSI) report, a hybrid automatic repeat request (HARQ) feedback for outer loop rate control (OLRC), mobility information associated with the UE, or the configured additional DMRS, generate the MCS data from signal-to-noise-plus-interference ratio (SNIR) values in a physical uplink shared channel (PUSCH) report, a hybrid automatic repeat request (HARQ) feedback for outer loop rate control (OLRC), mobility information associated with the UE, and the configured additional DMRS, and determine an optimal position of the additional DMRS from the generated MCS data to enhance a link adaptation (LA) in the wireless network.

18. A non-transitory computer readable storage medium storing instructions that, when executed by at least one processor of a base station individually or collectively, cause the base station to perform operations comprising:

establishing a radio resource control (RRC) connection with a user equipment (UE) in a wireless network;

receiving, from the UE, at least one report including information indicating channel condition of at least one radio channel, from the UE;

configuring, via a medium access control (MAC) control element (MAC-CE), an additional demodulation reference signal (DMRS) based on the information indicating the channel condition of the at least one radio channel; and sending the configured additional DMRS to the UE to reduce decoding failure of the at least one radio channel.

* * * * *